(12) United States Patent
Schade et al.

(10) Patent No.: US 12,227,136 B2
(45) Date of Patent: Feb. 18, 2025

(54) CONTROL SYSTEM AND VEHICLE

(71) Applicant: U Power Robotics USA Inc., Santa Clara, CA (US)

(72) Inventors: Kai Schade, Santa Clara, CA (US); Roger Karam, Santa Clara, CA (US); Yao Zhai, Santa Clara, CA (US); Holger Schanz, Santa Clara, CA (US)

(73) Assignee: U Power Robotics USA Inc., Santa Clara, CA (US)

( * ) Notice: Subject to any disclaimer, the term of this patent is extended or adjusted under 35 U.S.C. 154(b) by 115 days.

(21) Appl. No.: 18/107,590

(22) Filed: Feb. 9, 2023

(65) Prior Publication Data

US 2024/0270184 A1 Aug. 15, 2024

(51) Int. Cl.
*B60R 16/023* (2006.01)
(52) U.S. Cl.
CPC ................ *B60R 16/0231* (2013.01)
(58) Field of Classification Search
CPC .................. B60R 16/0231; B60R 16/0232
See application file for complete search history.

(56) References Cited

U.S. PATENT DOCUMENTS

2021/0302573 A1* 9/2021 Sugae ................ B60R 16/0231

* cited by examiner

*Primary Examiner* — Jacob M Amick
*Assistant Examiner* — Charles J Brauch
(74) *Attorney, Agent, or Firm* — FIDELI LAW PLLC

(57) ABSTRACT

A control system and a vehicle are provided. Each electronic control unit in the control system includes a first data I/O interface, a second data I/O interface, a first performance chip, a second performance chip, and a route selector in communication with the first data I/O interface, the second data I/O interface, the first performance chip, and the second performance chip. The route selector has a first mode and a second mode. In the first mode, the route selector enables a data communication between the first performance chip and the second performance chip. In the second mode, the route selector enables a data communication with the first performance chip and the first data I/O interface, and further connected to the second performance chip and the second data I/O interface. The control system can flexibly meet different control requirements by controlling the operation modes of the route selector.

20 Claims, 11 Drawing Sheets

CONTROL SYSTEM AND VEHICLE

TECHNICAL FIELD

This disclosure relates to the technical field of control, and in particular, to a control system and a vehicle.

BACKGROUND

Electronic control units (ECUs) are widely used in vehicles to control an executive component(s) in the vehicle. For example, a variety of sensors capable of collecting data related to vehicle operation may be installed in the vehicle. In another example, these sensors may collect data on braking, gear shifting, speed, acceleration, etc. during vehicle operation. The ECU may acquire at least some of the data collected by the sensors and process the data to obtain a control instruction. Subsequently, the ECU may send the control instruction to an executive component(s) to control the vehicle. Another example beyond pure sensor reading is that ECUs can be applied to assisted, automated, and autonomous driving. This may require the ECUs to perform certain functions such as reading sensors, performing sensor fusion, scene awareness, path planning, executor control, etc.

Different executive components in a vehicle may correspond to different control requirements (e.g., the required computational capacity). This requires technicians to design hardware and software based on the control requirement corresponding to each executive component during vehicle design, so as to obtain an ECU corresponding to the executive components. However, once the ECU is designed, the computational capacity of the ECU is fixed and it is difficult to expand the computational capacity. This makes the control system less scalable.

Therefore, it is necessary to provide a control system with high scalability in the field of control technology.

BRIEF SUMMARY

The present disclosure provides a control system with high scalability, and a vehicle.

According to a first aspect of the present disclosure, a control system may include at least one electronic control unit (ECU), where the at least one ECU each includes: a first data input/output (I/O) interface and a second data I/O interface, a first performance chip and a second performance chip, and a route selector in communication with the first data I/O interface, the second data I/O interface, the first performance chip, and the second performance chip, where the route selector includes a first mode and a second mode, in the first mode, the route selector enables data communication between the first performance chip and the second performance chip, and in the second mode, the route selector enables data communication between the first performance chip and the first data I/O interface, and further enables data communication between the second performance chip and the second data I/O interface.

In some exemplary embodiments, the route selector includes: a first route selecting component, in communication with the first performance chip and the first data I/O interface; a second route selecting component, in communication with the second performance chip, the second data I/O interface, and the first route selecting component; and at least one safety chip, in communication with the first route selecting component and the second route selecting component, where the at least one safety chip is configured to: in the first mode, control the first route selecting component and the second route selecting component to enable the data communication between the first performance chip and the second performance chip, and in the second mode, control the first route selecting component to enable the data communication between the first performance chip and the first data I/O interface, and control the second route selecting component to enable the data communication between the second performance chip and the second data I/O interface.

In some exemplary embodiments, the at least one safety chip includes: a first safety chip, in communication with the first performance chip and the first route selecting component; and a second safety chip, in communication with the second performance chip and the second route selecting component.

In some exemplary embodiments, the control system further includes a first power supply, configured to provide power for the first data I/O interface, the first performance chip, the first route selecting component, and the first safety chip of each of the at least one ECU; and a second power supply, configured to provide power for the second data I/O interface, the second performance chip, the second route selecting component, and the second safety chip of each of the at least one ECU.

In some exemplary embodiments, the first performance chip generates first control data during operation, and the second performance chip generates second control data during operation; and the at least one safety chip is in communication with the first performance chip and the second performance chip to verify at least one of the first control data or the second control data.

In some exemplary embodiments, the at least one ECU each further includes: a printed circuit board (PCB) including two performance chip interfaces, where the first data I/O interface and the second data I/O interface are disposed on the PCB, and the first performance chip and the second performance chip are disposed on the two performance chip interfaces, respectively.

In some exemplary embodiments, communications in each ECU is through a unified bus connection.

In some exemplary embodiments, the communications in each ECU is based on a Peripheral Component Interconnect Express (PCIe) protocol.

In some exemplary embodiments, the at least one ECU includes M ECUs connected in a preset topology, M is an integer greater than 1; and the first data I/O interface of each of the M ECUs is in communication with the first data I/O interface or the second data I/O interface of a neighboring ECU in the preset topology to form a ring connection.

In some exemplary embodiments, communications between components in each ECU are based on a first communication protocol; communications between data I/O interfaces of different ECUs are based on a second communication protocol; and the first communication protocol is the same as the second communication protocol.

In some exemplary embodiments, the control system further including a switch circuit, where the at least one ECU includes M ECUs, M is an integer greater than 1, and the switch circuit is in communication with the first data I/O interface and the second data I/O interface of each of the M ECUs to form a star connection.

In some exemplary embodiments, the switch circuit includes: a first switch, respectively in communication with the first data I/O interface of each of the M ECUs; and a second switch, in communication with the first switch, and respectively in communication with the second data I/O interface of each of the M ECUs.

According to a second aspect of the present disclosure, a vehicle may include an executive component; and a control system configured to send control data to the executive component, including at least one electronic control unit (ECU), where the at least one ECU each includes: a first data input/output (I/O) interface and a second data I/O interface; a first performance chip and a second performance chip; and a route selector in communication with the first data I/O interface, the second data I/O interface, the first performance chip, and the second performance chip, where the route selector includes a first mode and a second mode, in the first mode, the route selector enables a data communication between the first performance chip and the second performance chip, and in the second mode, the route selector enables a data communication between the first performance chip and the first data I/O interface, and further enables a data communication between the second performance chip and the second data I/O interface.

In some exemplary embodiments, the route selector includes: a first route selecting component, in communication with the first performance chip and the first data I/O interface; a second route selecting component, in communication with the second performance chip, the second data I/O interface, and the first route selecting component; and at least one safety chip, in communication with the first route selecting component and the second route selecting component, where the at least one safety chip is configured to: in the first mode, control the first route selecting component and the second route selecting component to enable the data communication between the first performance chip and the second performance chip, and in the second mode, control the first route selecting component to enable the data communication between the first performance chip and the first data I/O interface, and control the second route selecting component to enable a communication between the second performance chip and the second data I/O interface.

In some exemplary embodiments, the at least one safety chip includes: a first safety chip, in communication with the first performance chip and the first route selecting component; and a second safety chip, in communication with the second performance chip and the second route selecting component.

In some exemplary embodiments, the control system further includes a first power supply, configured to provide power for the first data I/O interface, the first performance chip, the first route selecting component, and the first safety chip of each of the at least one ECU; and a second power supply, configured to provide power for the second data I/O interface, the second performance chip, the second route selecting component, and the second safety chip of each of the at least one ECU.

In some exemplary embodiments, the first performance chip generates first control data during operation, and the second performance chip generates second control data during operation; and the at least one safety chip is in communication with the first performance chip and the second performance chip to verify at least one of the first control data or the second control data.

In some exemplary embodiments, the at least one ECU each further includes: a printed circuit board (PCB) including two performance chip interfaces, where the first data I/O interface and the second data I/O interface are disposed on the PCB, and the first performance chip and the second performance chip are disposed on the two performance chip interfaces respectively.

In some exemplary embodiments, communications in each ECU is through a unified bus connection.

In some exemplary embodiments, the communications in each ECU is based on a Peripheral Component Interconnect Express (PCIe) protocol.

In some exemplary embodiments, the at least one ECU includes M ECUs connected in a preset topology, M is an integer greater than 1; and the first data I/O interface of each of the M ECUs is in communication with the second data I/O interface of a neighboring ECU in the preset topology to form a ring connection.

In some exemplary embodiments, communication connection between components in each ECU is based on a first communication protocol; communication connection between data I/O interfaces of different ECUs is based on a second communication protocol; and the first communication protocol is the same as the second communication protocol.

In some exemplary embodiments, the vehicle further includes a switch circuit, where the at least one ECU includes M ECUs, M is an integer greater than 1, and the switch circuit is in communication with the first data I/O interface and the second data I/O interface of each of the M ECUs to form a star connection.

In some exemplary embodiments, the switch circuit includes: a first switch, respectively in communication with the first data I/O interface of each of the M ECUs; and a second switch, in communication with the first switch, and respectively in communication with the second data I/O interface of each of the M ECUs.

In light of the above technical solutions, this disclosure provides a control system and a vehicle. Each ECU in the control system includes a first data I/O interface, a second data I/O interface, a first performance chip, a second performance chip, and a route selector. The route selector is in communication with the first data I/O interface, the second data I/O interface, the first performance chip, and the second performance chip. Operation modes of the route selector include a first mode and a second mode. In the first mode, the route selector enables the data communication between the first performance chip and the second performance chip, and in the second mode, the route selector enables the data communication between the first performance chip and the first data I/O interface, and enables the data communication between the second performance chip and the second data I/O interface. Based on this solution, the ECU can flexibly meet different control requirements by controlling the operation mode of the route selector. For example, the route selector may be controlled to work in the first mode, such that the control requirement may be implemented by using the computational capacity of a single ECU. In another example, the route selector may be controlled to work in the second mode, to implement the control requirement by combining the computational capacities of multiple ECUs. Therefore, the control system provided by the present disclosure has higher scalability.

Other functions of the control system and the vehicle provided by this disclosure will be described in the following descriptions. The control system and the vehicle provided by this disclosure may be understood by practicing or using the methods, apparatuses and combinations thereof described in the following detailed examples.

BRIEF DESCRIPTION OF THE DRAWINGS

To describe the technical solutions in the examples of this disclosure, the accompanying drawings of the examples will be briefly described below. Apparently, the accompanying drawings described below are only some examples of this disclosure. Those of ordinary skill in the art may further obtain other drawings based on these accompanying drawings without inventive efforts.

DETAILED DESCRIPTION

Figure 1:
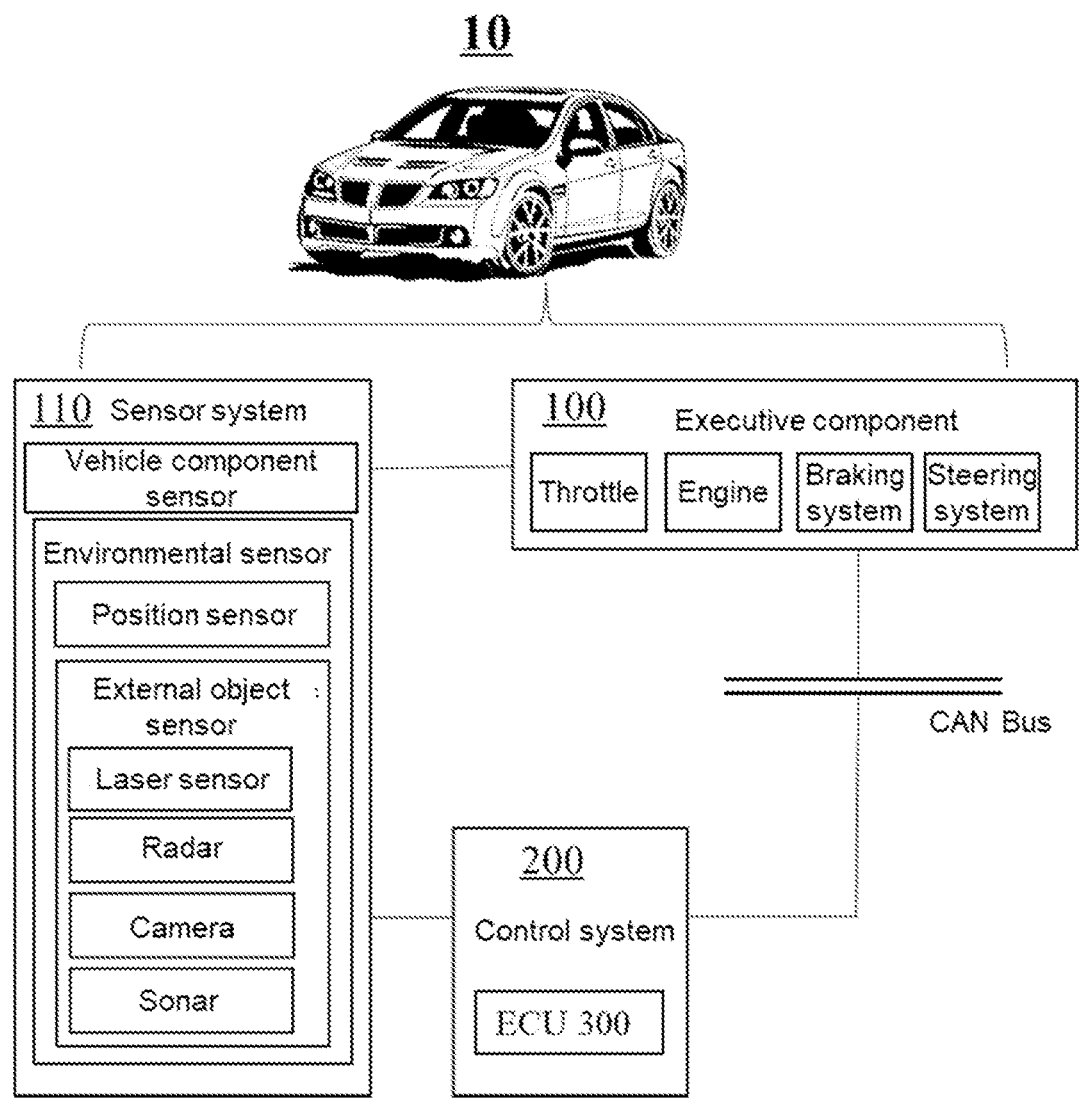
FIG. 1 is a schematic structural diagram of a vehicle according to some exemplary embodiments of this disclosure.

The following description provides specific application scenarios and requirements of this disclosure, with the purpose of enabling those skilled in the art to understand and use the contents in this disclosure. For those skilled in the art, various modifications to the disclosed exemplary embodiments would be obvious. Without departing from the spirit and scope of this disclosure, the general principles defined herein may be applied to other applications. Therefore, the disclosure is not limited to the exemplary embodiments, but is the consistent with the broadest scope of the claims.

The terms used herein are merely intended to describe some specific examples or embodiments, rather than to limit the present disclosure. For example, unless otherwise stated, singular forms "a", "an" and "this" used herein may also include plural forms. In this disclosure, the terms "include" and/or "comprise" refer to the existence of an associated integer, step, operation, element and/or component, without excluding the existence of one or more other features, integers, steps, operations, elements, components and/or groups, or the addition of other features, integers, steps, operations, elements, components and/or groups to the system/method.

In consideration of the following description, in this disclosure, these and other features, the operation and functions of related elements of structures, as well as the economy of the combination and manufacturing of components may be significantly improved. With reference to the drawings, all of these form a part of this disclosure. However, it should be clearly understood that the drawings are merely intended for illustration and description purposes, rather than to limit the scope of this disclosure. It should be further understood that the accompanying drawings are not drawn to scale.

The flowcharts provided in this disclosure illustrate the operating steps implemented by the system according to some exemplary embodiments in this disclosure. It should be understood that the operating steps in the flowchart may be implemented in different sequences. For example, the operating steps may be implemented in a reverse sequence or simultaneously. In addition, one or more other operating steps may be added to the flowcharts. One or more operating steps may be removed from the flowcharts.

The terms such as "first" and "second" herein are used to differentiate different items belonging to the same name category, rather than restricting the order or number of items. For example, "first information" and "second information" are only information of different contents or purposes, but do not have a temporal relationship or priority relationship. The first information may be one or more pieces of information, and the second information may also be one or more pieces of information.

In this disclosure, the term "at least one" refers to one or more, and the term "multiple/a plurality of" refers to two or more. The term "and/or" is an association relationship for describing associated objects, and represents that three relationships may exist, for example, A and/or B may represent that: A exists alone, A and B exist at the same time, and B exists alone. The character "/" generally indicates that the associated objects are in an "or" relationship. The term "at least one of the followings" or similar expression refers to any combination of these items, including any combination of single items or plural items. For example, at least one of a, b, or c may represent: a; b; c; a and b; a and c; b and c; or a, b and c, where a, b, and c each may include one or more items.

It should be noted that, in the present disclosure, a connection may be a direct connection or an indirect connection. For example, A and B being connected may mean that A and B are directly connected, or A and B are connected through C.

FIG. 1 is a schematic structural diagram of a vehicle 10 according to some exemplary embodiments of this disclosure. The vehicle 10 may be an autonomous vehicle or a non-autonomous vehicle. When the vehicle 10 is an autonomous vehicle, the autonomous driving level of the vehicle 10 may be any of the following levels: a driver-assistance driving level, a partially autonomous driving level, and a fully autonomous driving automation level. As shown in FIG. 1, the vehicle 10 may include an executive component 100, a sensing system 110, and a control system 200.

The executive component 100 may be a component of the vehicle 10 which is capable of receiving control data and controlling the vehicle 10 based on the control data. For example, the executive component 100 may include, but is not limited to, a motor, a transmission, a chassis, a throttle, an engine, and a driving executive component of a braking system or a steering system (including steering of tires and/or operation of turn signals) in the vehicle 10. The executive component 100 may also include other components of the vehicle 10.

The sensing system 110 may include a plurality of sensors. The plurality of sensors may include various internal and external sensors that provide data to the vehicle 10. For example, as shown in FIG. 1, the plurality of sensors may include a vehicle component sensor and an environmental sensor. The vehicle component sensor may be connected to the executive component 100 of the vehicle 10, and may be configured to detect an operating status and parameters of each member of the executive component 100.

The environmental sensor allows the vehicle to understand and potentially respond to its environment, so as to help the vehicle 10 perform navigation and route planning, and ensure safety of passengers and safety of people or property in the surrounding environment. The environmental sensor may also be used to identify, track and predict movements of objects, such as pedestrians and other vehicles. The environmental sensor may include a position sensor and an external object sensor.

The position sensor may include a receiver, such as a Global Positioning System (GPS) receiver, an accelerometer, a gyroscope, and any combination thereof. The position sensor may sense and/or determine geographic locations and orientations of the vehicle 10. For example, the position sensor may determine latitude, longitude and altitude of the vehicle.

The external object sensor may detect objects outside the vehicle, such as other vehicles, obstacles, traffic signals, signs, trees and the like. The external object sensor may include a laser sensor, a radar, a camera, a sonar, and/or other detection devices.

The control system 200 is in communication with the executive component 100 and the sensing system 110. After receiving information sensed by the sensing system 110, the control system 200 may process information and/or data related to vehicle driving (for example, autonomous driving) and send control data to the executive component 100 to perform one or more functions described in the present disclosure.

It should be noted that, the vehicle 10 may include one or more executive components 100. When the vehicle 10 includes a plurality of executive components 100, each executive component 100 may correspond to one control system 200. For example, the vehicle 10 may include: a motor, a transmission, a chassis, a control system corresponding to the motor, a control system corresponding to the transmission, and a control system corresponding to the chassis.

Referring to FIG. 1, the control system 200 may include at least one ECU 300. It should be noted that, the control system 200 may include one or more ECUs 300, for example, 2, 3, 4, or more ECUs, which is not limited in the present disclosure. An ECU is taken as an example in FIG. 1. In some exemplary embodiments, when the vehicle 10 includes a plurality of executive components 100, it is possible that control systems 200 corresponding to some executive components 100 each include an ECU 300, while control systems 200 corresponding to other executive components 100 each include a plurality of ECUs 300.

Figure 2:
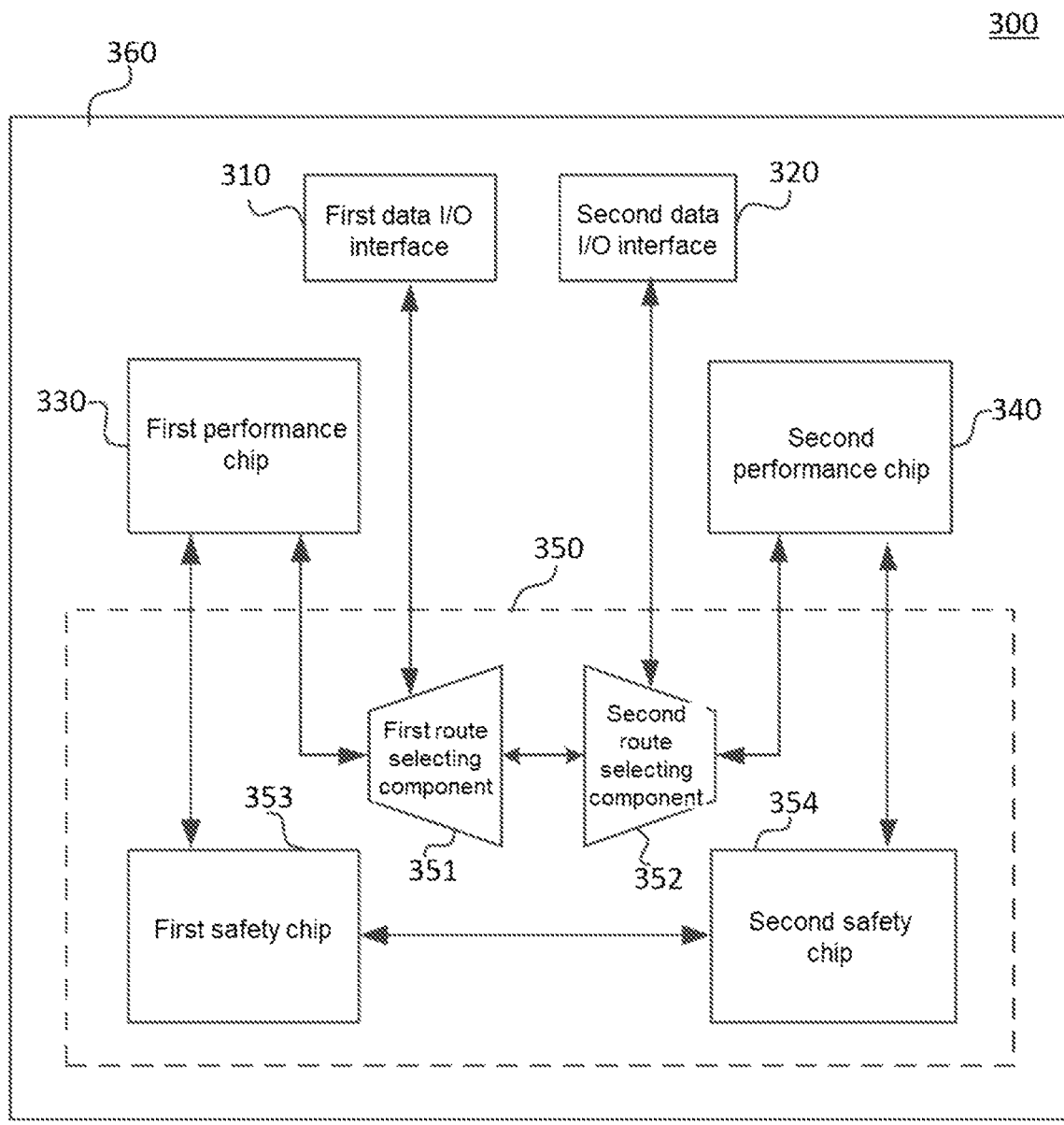
FIG. 2 is a schematic structural diagram of an ECU according to some exemplary embodiments of this disclosure.

FIG. 2 is a schematic structural diagram of an ECU 300 according to some exemplary embodiments of this disclosure. As shown in FIG. 2, the ECU 300 may at least include: two first data I/O interfaces, two performance chips, and a route selector 350. For example, the performance chip may be a performance SoC. For ease of description, the two first data I/O interfaces are referred to as a first data I/O interface 310 and a second data I/O interface 320, respectively. Moreover, the two performance chips are referred to as a first performance chip 330 and a second performance chip 340, respectively. It should be understood that, in the same ECU 300, the first data I/O interface 310 and the second data I/O interface are interchangeable, and the first performance chip 330 and the second performance chip 340 are also interchangeable.

The first data I/O interface 310 and the second data I/O interface 320 may be configured to transmit data between different ECUs 300. In some exemplary embodiments, when the control system 200 includes a plurality of ECUs 300, both the first data I/O interface 310 and the second data I/O interface 320 may be in communication with data I/O interfaces of other ECUs, and may be configured to receive data from other ECUs or output data to other ECUs.

In some exemplary embodiments, both the first data I/O interface and the second data I/O interface may be interfaces based on a line driver. For example, the first data I/O interface and the second data I/O interface may be Retimer chips, in order to balance and enhance the control data.

The first performance chip 330 and the second performance chip 340 may be chips with certain computational capacity. In some exemplary embodiments, the first performance chip 330 and the second performance chip 340 are both configured to generate control data. That is, the first performance chip 330 generates first control data during operation; the second performance chip 340 generates second control data during operation. For example, the control data may be obtained by collecting data from at least some sensors of the vehicle by the performance chip (the first performance chip 330 or the second performance chip 340) and performing processing on the data. In another example, the control data may alternatively be obtained by receiving upper-level control data from other performance chips by the performance chip (the first performance chip 330 or the second performance chip 340) and performing processing on the upper-level control data. The above other performance chips may be other performance chips in a same ECU, or may be other performance chips in different ECUs. In another example, the control data may further be obtained by collecting data from at least some sensors of the vehicle and receiving upper-level control data from other performance chips by the performance chip (the first performance chip 330 or the second performance chip 340), and performing processing on the data collected from the sensors and the upper-level control data.

Compared with an ECU including only one performance chip, the ECU 300 includes two performance chips to extend the computational capacity. This design may improve the computational capacity of a single ECU.

In some exemplary embodiments, the first performance chip 330 and the second performance chip 340 in the same ECU 300 may generate same control data. In such a case, the first performance chip 330 and the second performance chip 340 may implement the same control function, and have a redundant backup relationship. By setting a performance chip for redundant backup in the control system, the security of the control function provided by the control system may be improved, which is applicable to scenarios with high security requirements on the control function.

In some exemplary embodiments, the first performance chip 330 and the second performance chip 340 may generate different control data. In such a case, the first performance chip 330 and the second performance chip 340 may implement different control functions. The control requirement of the executive component may be implemented by coordination of the first performance chip 330 and the second performance chip 340, which is applicable to scenarios in which the executive component has complex control requirements.

Further referring to FIG. 2, the route selector 350 may be in communication with the first data I/O interface 310, the second data I/O interface 320, the first performance chip 330, and the second performance chip 340. Operation modes of the route selector 350 may include a first mode and a second mode. According to different operation modes, the route selector 350 may form separate/different data paths among the first performance chip 330, the second performance chip 340, the first data I/O interface 310, and the second data I/O interface 320 in a controllable manner.

In the first mode, the route selector 350 may enable the data communication between the first performance chip 330 and the second performance chip 340. In this way, data may be transmitted between the first performance chip 330 and the second performance chip 340. For example, the control data generated by the first performance chip 330 may be transmitted to the second performance chip 340, or the control data generated by the second performance chip 340 may be transmitted to the first performance chip 330.

In the second mode, the route selector 350 may enable a connection between the first performance chip 330 and the first data I/O interface 310, and may be further enables a connection between the second performance chip 340 and the second data I/O interface 320. In this way, data may be transmitted between the first performance chip 330 and the first data I/O interface 310. For example, the control data transmitted by the first performance chip 330 may be transmitted to the first data I/O interface 310, and then transmitted to other ECUs through the first data I/O interface 310, or control data from other ECUs may be received by the first data I/O interface, and then transmitted to the first performance chip 330 through the first data I/O interface. Data may be transmitted between the second performance chip 340 and the second data I/O interface 320. For example, control data generated by the second performance chip 340 may be transmitted to the second data I/O interface 320, and then transmitted to other ECUs through the second data I/O interface 320; or control data from other ECUs may be received by the second data I/O interface 320, and then transmitted to the second performance chip 340 through the second data I/O interface 320.

It should be understood that, the operation modes of the route selector 350 may include the first mode and the second mode; in the first mode, the route selector 350 may enable a connection between the first performance chip 330 and the second performance chip 340; in the second mode, the route selector 350 may be connected to the first performance chip 330 and the first data I/O interface 310, and further connected to the second performance chip 340 and the second data I/O interface 320. Therefore, by controlling the operation mode of the route selector 350, the ECU may flexibly meet various control requirements. For example, in a scenario in which the executive component has relatively simple control requirements, the route selector 350 may be controlled to work in the first mode, to implement the control requirements of the executive component by using the computational capacity of a single ECU. In another example, in a scenario in which the executive component has relatively complex control requirements, the route selector 350 may be controlled to work in the second mode, to implement the control requirements of the executive component by combining the computational capacity of multiple ECUs. It can be seen that the computational capacity of the control system provided by the present disclosure has high scalability.

Further referring to FIG. 1, in some exemplary embodiments, the route selector 350 may include a first route selecting component 351, a second route selecting component 352, and at least one safety chip. In some exemplary embodiments, the safety chip may be a safety system on chip (safety SOC).

The first route selecting component 351 may be in communication with the first performance chip 330 and the first data I/O interface 310. The second route selecting component 352 may be in communication with the first route selecting component 351, the second performance chip 340, and the second data I/O interface 320. The at least one safety chip may be in communication with the first route selecting component 351 and the second route selecting component 352. In the first mode, the at least one safety chip may be enable the data communication between the first performance chip 330 and the second performance chip 340 by controlling states of the first route selecting component 351 and the second route selecting component 352. In the second mode, the at least one safety chip may enable the data communication between the first performance chip 330 and the first data I/O interface by controlling the state of the first route selecting component 351, and may further enable the data communication between the second performance chip 340 and the second data I/O interface by controlling the state of the second route selecting component 352. In other words, the at least one safety chip may implement a route selection function by controlling the first route selecting component 351 and the second route selecting component 352.

In some exemplary embodiments, the first route selecting component 351 and the second route selecting component 352 may be multiplexers. The multiplexer is a device that can perform a function similar to single-blade double-throw. For example, the multiplexer may include a static contact, a first dynamic contact, a second dynamic contact, and a connector. A first terminal of the connector is connected to the static contact, and a second terminal of the connector may be selectively connected to the first dynamic contact or the second dynamic contact. An exemplary connection manner is as follows: the static contact of the first route selecting component 351 may be connected to the first performance chip 330, the static contact of the second route selecting component 352 may be connected to the second performance chip 340, the first dynamic contact of the first route selecting component 351 may be connected to the first data I/O interface 310, the first dynamic contact of the second route selecting component 352 may be connected to the second data I/O interface 320, and the second dynamic contact of the first route selecting component 351 may be connected to the second dynamic contact of the second route selecting component 351.

In the first mode, the at least one safety chip may control the second terminal of the connector in the first route selecting component 351 to be connected to the second dynamic contact, and control the connector in the second route selecting component 352 to be connected to the second dynamic contact, such that the first performance chip 330, the static contact of the first route selecting component 351, the second dynamic contact of the first route selecting component 351, the second dynamic contact of the second route selecting component 352, the static contact of the second route selecting component 352, and the second performance chip 340 may form a data path therebetween.

In the second mode, the at least one safety chip may control the second terminal of the connector in the first route selecting component 351 to be connected to the first dynamic contact, such that the first performance chip 330, the static contact of the first route selecting component 351, the first dynamic contact of the first route selecting component 352, and the first data I/O interface 310 may form a data path therebetween. The at least one safety chip may further control the connector in the second route selecting component 352 to be connected to the first dynamic contact, such that the second performance chip 340, the static contact of the second route selecting component 352, the first dynamic contact of the second route selecting component 352, and the second data I/O interface 320 may form a data path therebetween.

In some exemplary embodiments, further referring to FIG. 2, the at least one safety chip may include a first safety chip 353 and a second safety chip 354. The first safety chip 353 may be in communication with the first route selecting component 351, and the second safety chip 354 may be in communication with the second route selecting component 352. In the first mode, the first safety chip 353 controls the state of the first route selecting component 351, and the second safety chip 354 controls the state of the second route selecting component 352, so as to enable the communication between the first performance chip 330 and the second performance chip 340. In the second mode, the first safety chip 353 controls the state of the first route selecting component 351, to enable the communication between the first performance chip 330 and the first data I/O interface 310; the second safety chip 354 controls the state of the second route selecting component 352, to enable the communication between the second performance chip 340 and the second data I/O interface 320.

In some exemplary embodiments, the at least one safety chip may be further configured to verify the control data generated by the performance chip (at least one of the first performance chip 330 and the second performance chip 340). In some exemplary embodiments, further referring to FIG. 2, the first safety chip 353 may be further in communication with the first performance chip 330, the second safety chip 354 may be further in communication with the second performance chip 340, and the first safety chip 353 may be further in communication with the second safety chip 354.

In the following, the control system 200 and the data transmission manner in the control system 200 will be illustrated with reference to FIG. 3 to FIG. 7 by using a specific application scenario as an example.

Figure 3:
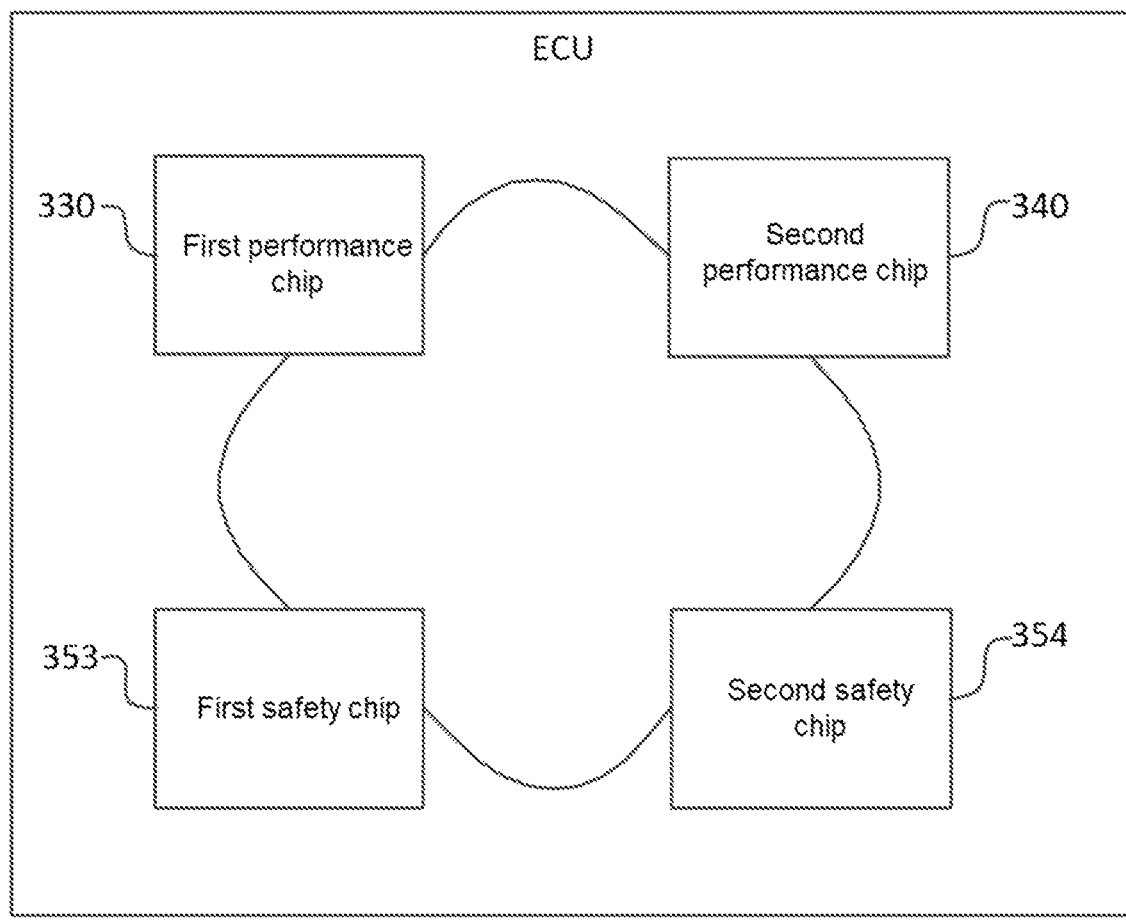
FIG. 3 is a schematic diagram of a data path of a single ECU in a first mode according to some exemplary embodiments of this disclosure.

In some exemplary application scenarios, the executive component in the vehicle 10 may have relatively simple control requirements, which may be accomplished with a single ECU 300. In such a scenario, the control system 200 corresponding to the executive component may include one ECU 300, and the structure of the ECU 300 is as shown in FIG. 2. The route selector 350 in the ECU 300 operates in the first mode. As an example, FIG. 3 is a schematic diagram of a data path of a single ECU in a first mode according to some exemplary embodiments of this disclosure. As shown in FIG. 3, in the first mode, the route selector 350 in the ECU 300 is connected to the first performance chip 330 and the second performance chip 340, thus the first performance chip 330, the second performance chip 340, the second safety chip 354, and the first safety chip 353 in the ECU 300 may form a ring data path therebetween. Different chips may transmit data to one another based on the ring data path.

Based on the ring data path shown in FIG. 3, the control data may be transmitted from one chip to any one of the other three chips. The safety chip may verify the control data generated by the performance chip in various manners. For example, the first safety chip 353 may be configured to verify the control data generated by the first performance chip 330, and the second safety chip 354 may be configured to verify the control data generated by the second performance chip 340. In another example, the first safety chip 353 may be configured to verify the control data generated by the second performance chip 340, and the second safety chip 354 may be configured to verify the control data generated by the first performance chip 330. Certainly, other verification manners may also be used, which are not limited in the present disclosure. Based on the ring data path, no communication conflict may occur during transmission of the control data, such that the control system has low jitter and high throughput.

Based on the ring data path shown in FIG. 3, the control system 200 may control the executive component in the following manners. For example, the first performance chip 330 may generate first control data, and transmit the first control data to the first safety chip 353 along the ring data path. The first safety chip 353 may verify the first control data. If the verification result is that a preset safety condition is satisfied, the first safety chip 353 or the first performance chip 330 may send the first control data to the executive component. In another example, the second performance chip 340 may generate second control data, and transmit the second control data to the second safety chip 354 along the ring data path. The second safety chip 354 may verify the second control data. If the verification result is that the preset safety condition is satisfied, the second safety chip 354 or the second performance chip 340 may send the second control data to the executive component. In another example, the first performance chip 330 may generate first control data, and transmit the first control data to the first safety chip 353 along the ring data path. The first safety chip 353 may verify the first control data. If the verification result is that the preset safety condition is satisfied, the first performance chip 330 may transmit the first control data to the second performance chip 340 along the ring data path. The second performance chip 340 may generate second control data based on the first control data, and transmit the second control data to the second safety chip 354 along the ring data path. The second safety chip 354 may verify the second control data. If the verification result is that the preset safety condition is satisfied, the second safety chip 354 or the second performance chip 340 may send the second control data to the executive component.

Figure 4:
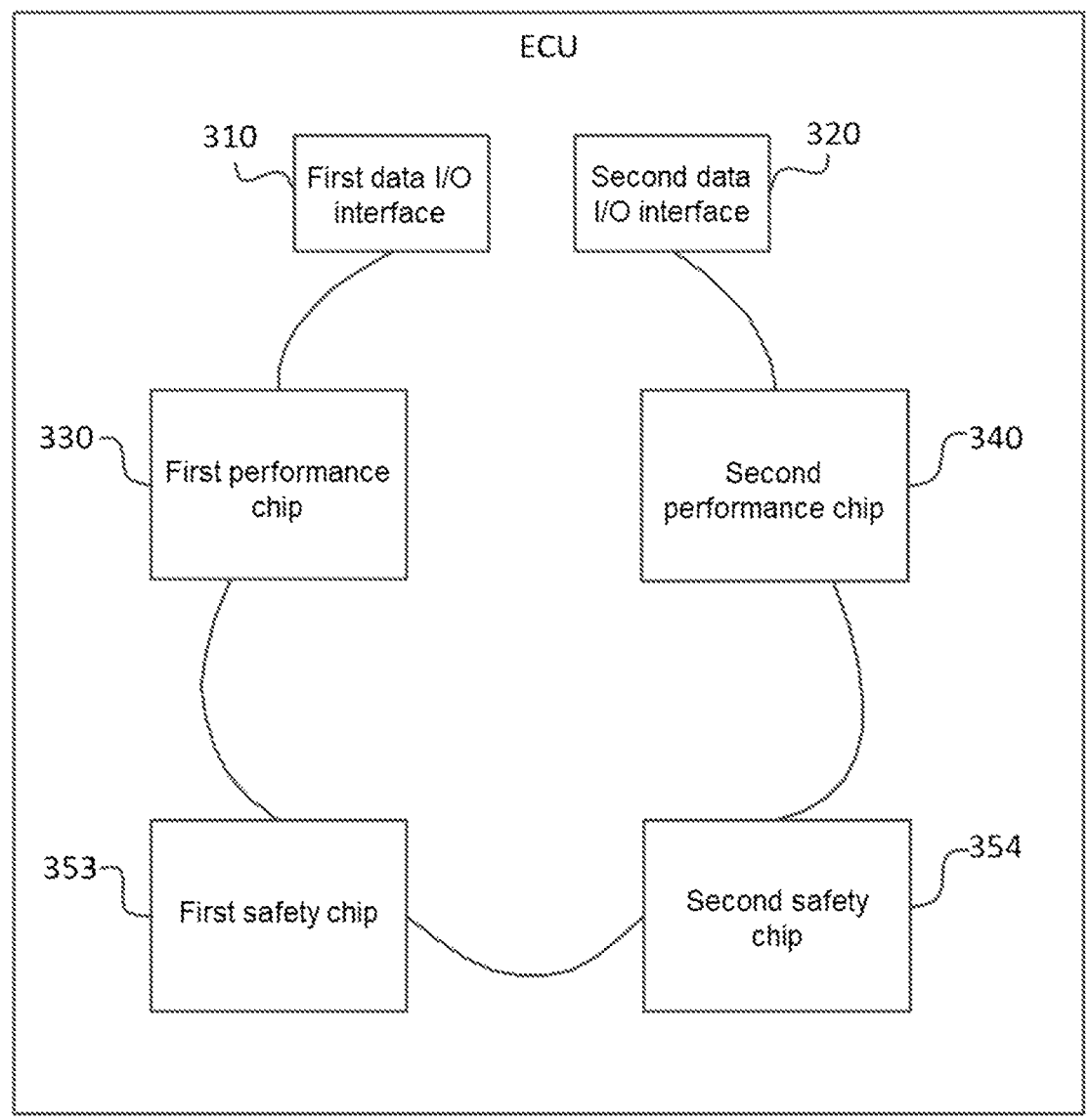
FIG. 4 is a schematic diagram of a data path of a single ECU in a second mode according to some exemplary embodiments of this disclosure.

In some exemplary application scenarios, the executive component in the vehicle 10 may have relatively complex control requirements, and a single ECU 300 may not be able to meet the control requirements of the executive component. In such a scenario, the control system 200 corresponding to the executive component may include a plurality of ECUs 300, such that control over the executive component may be implemented by coordination of the plurality of ECUs 300. The structure of each ECU 300 may be as shown in FIG. 2. The route selector 350 in each ECU 300 may operate in the second mode. As an example, FIG. 4 is a schematic diagram of a data path of a single ECU in a second mode according to some exemplary embodiments of this disclosure. As shown in FIG. 4, in the second mode, the route selector 350 in each ECU 300 may be connected to the first performance chip 330 and the first data I/O interface 310, and further connected to the second performance chip 340 and the second data I/O interface 320. Therefore, in each ECU 300, the first data I/O interface 310, the first performance chip 330, the second performance chip 340, the second safety chip 354, the first safety chip 353, and the second data I/O interface 320 may form a data path therebetween. Different chips may transmit data to one another based on the data path.

In some exemplary embodiments, based on the data path formed in the single ECU shown in FIG. 4, when the control system 200 includes M ECUs, where M is an integer greater than 1, M ECUs may be connected in a preset topology. In some exemplary embodiments, the preset topology may be a ring connection. In such a connection manner, the first data I/O interface in each of the M ECUs may be in communication with the first data I/O interface or the second data I/O interface of a neighboring ECU on the topology, such that the performance chips of the M ECUs may form a ring connection. It should be noted that "the performance chips of the M ECUs forming a ring connection" herein refers to that every two performance chips among the M ECUs are in communication to form a ring data path. Two performance chips may be connected directly or indirectly for communication, which is not limited herein.

Figure 5A:
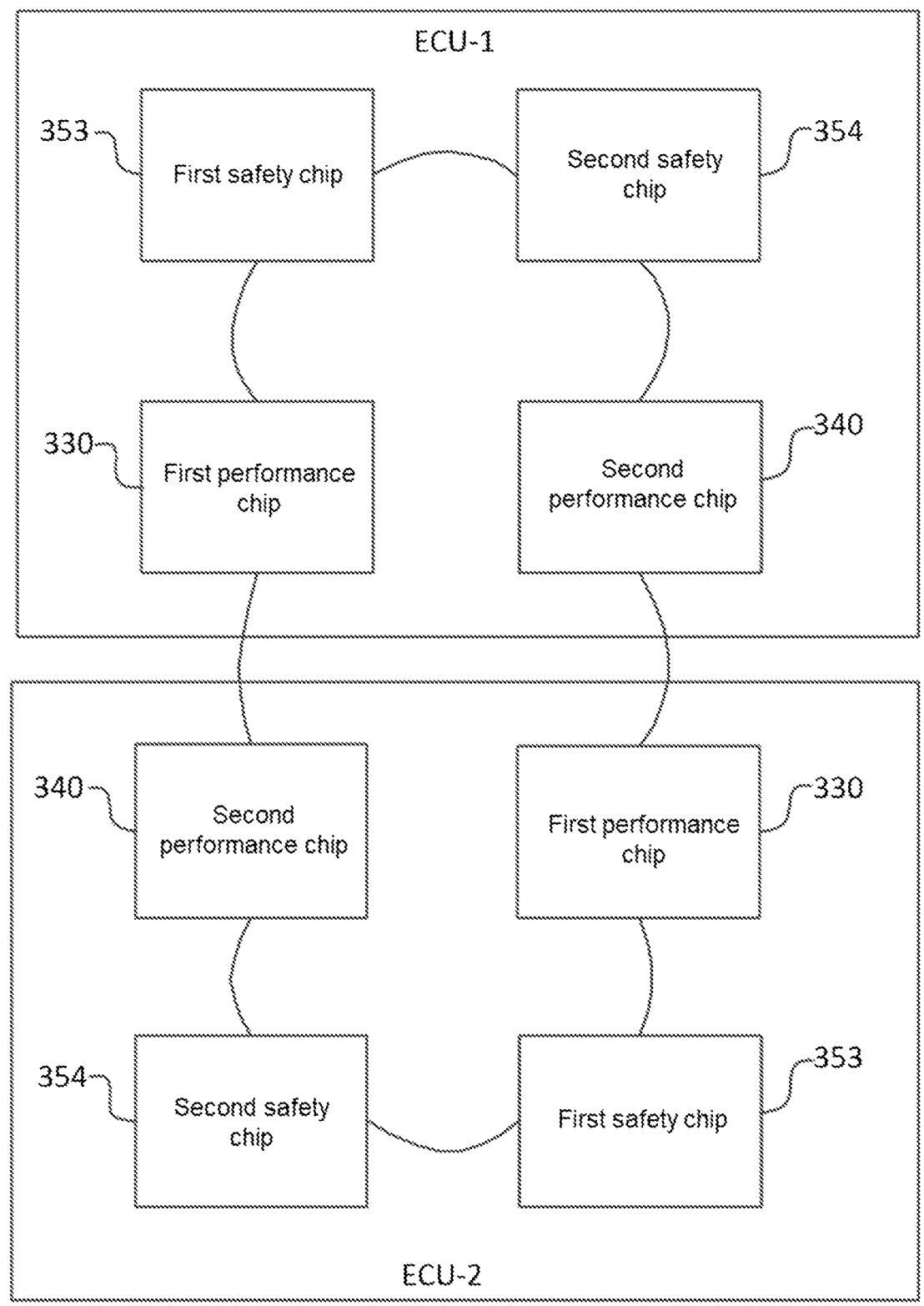
FIG. 5A is a schematic diagram of a ring data path formed by two ECUs according to some exemplary embodiments of this disclosure.

As an example, it is assumed that M=2. The control system 200 includes two ECUs, which are ECU-1 and ECU-2, respectively. The data I/O interfaces of the two ECUs may have the following connection relationship: the first data I/O interface of ECU-1 is in communication with the second data I/O interface of the ECU-2, and the first data I/O interface of ECU-2 is in communication with the second data I/O interface of ECU-1. In this way, the performance chips of the two ECUs may form a ring connection. FIG. 5A is a schematic diagram of a ring data path formed by two ECUs according to some exemplary embodiments of this disclosure. It should be noted that, the connection relationship of the data I/O interfaces in the two ECUs is not shown in FIG. 5A. As shown in FIG. 5A, the first safety chip 353 in ECU-1, the first performance chip 330 in ECU-1, the second performance chip 340 in ECU-2, the second safety chip 354 in ECU-2, the first safety chip 353 in ECU-2, the first performance chip 330 in ECU-2, the second performance chip 340 in ECU-1, the second safety chip 354 in ECU-1, and the first safety chip 353 in ECU-1 are sequentially connected to form a ring data path between the chips of the two ECUs. It should be noted that the data transmission manner based on the ring data path shown in FIG. 5A is similar to the data transmission manner based on the ring data path shown in FIG. 3. Therefore, details are not described herein.

As an example, it is assumed that M=4. The control system 200 includes four ECUs, which are ECU-1, ECU-2, ECU-3, and ECU-4, respectively. The data I/O interfaces of the four ECUs may have the following connection relationship: the first data I/O interface of ECU-1 may be in communication with the second data I/O interface of ECU-2, the first data I/O interface of ECU-2 may be in communication with the second data I/O interface of ECU-3, the first data I/O interface of ECU-3 may be in communication with the second data I/O interface of ECU-4, and the first data I/O interface of ECU-4 may be in communication with the second data I/O interface of ECU-1. In this way, the performance chips of the four ECUs may form a ring connection.

Figure 5B:
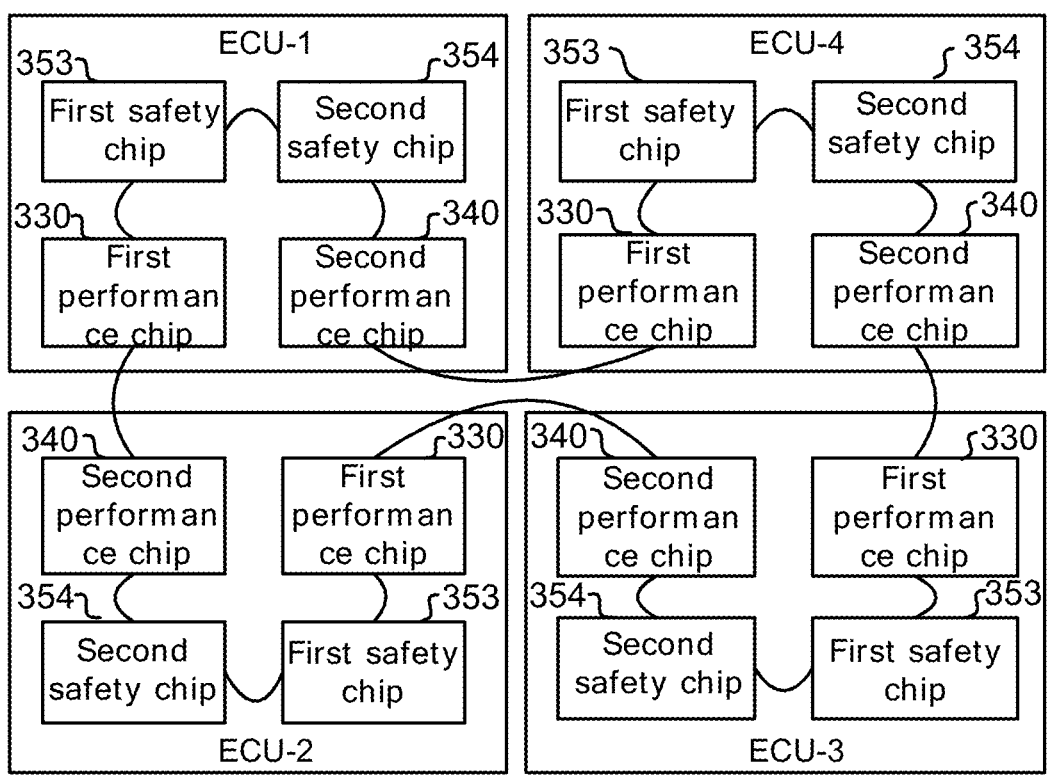
FIG. 5B is a schematic diagram of a ring data path formed by four ECUs according to some exemplary embodiments of this disclosure.

FIG. 5B is a schematic diagram of a ring data path formed by four ECUs according to some exemplary embodiments of this disclosure. It should be noted that, the connection relationship of the data I/O interfaces in the four ECUs is not shown in FIG. 5B. As shown in FIG. 5B, the first safety chip 353 in ECU-1, the first performance chip 330 in ECU-1, the second performance chip 340 in ECU-2, the second safety chip 354 in ECU-2, the first safety chip 353 in ECU-2, the first performance chip 330 in ECU-2, the second performance chip 340 in ECU-3, the second safety chip 354 in ECU-3, the first safety chip 353 in ECU-3, the first performance chip 330 in ECU-3, the second performance chip 340 in ECU-4, the second safety chip 354 in ECU-4, the first safety chip 353 in ECU-4, the first performance chip 330 in ECU-4, the second performance chip 340 in ECU-1, the second safety chip 354 in ECU-1, and the first safety chip 353 in ECU-1 may be sequentially connected to form a ring data path between the chips of the four ECUs. It should be noted that the data transmission manner based on the ring data path shown in FIG. 5B is similar to the data transmission manner based on the ring data path shown in FIG. 3. Therefore, details are not described herein.

It should be understood that, the data paths formed between a plurality of ECUs shown in FIG. 5A and FIG. 5B are merely some examples, and data paths in other forms may also be formed, which is not limited in the present disclosure. In the above control system shown in FIG. 5A and FIG. 5B, by connecting the data I/O interfaces of different ECUs to each other, the computing performance of the control system can be expanded conveniently by increasing the number of ECUs in the control system.

Figure 6:
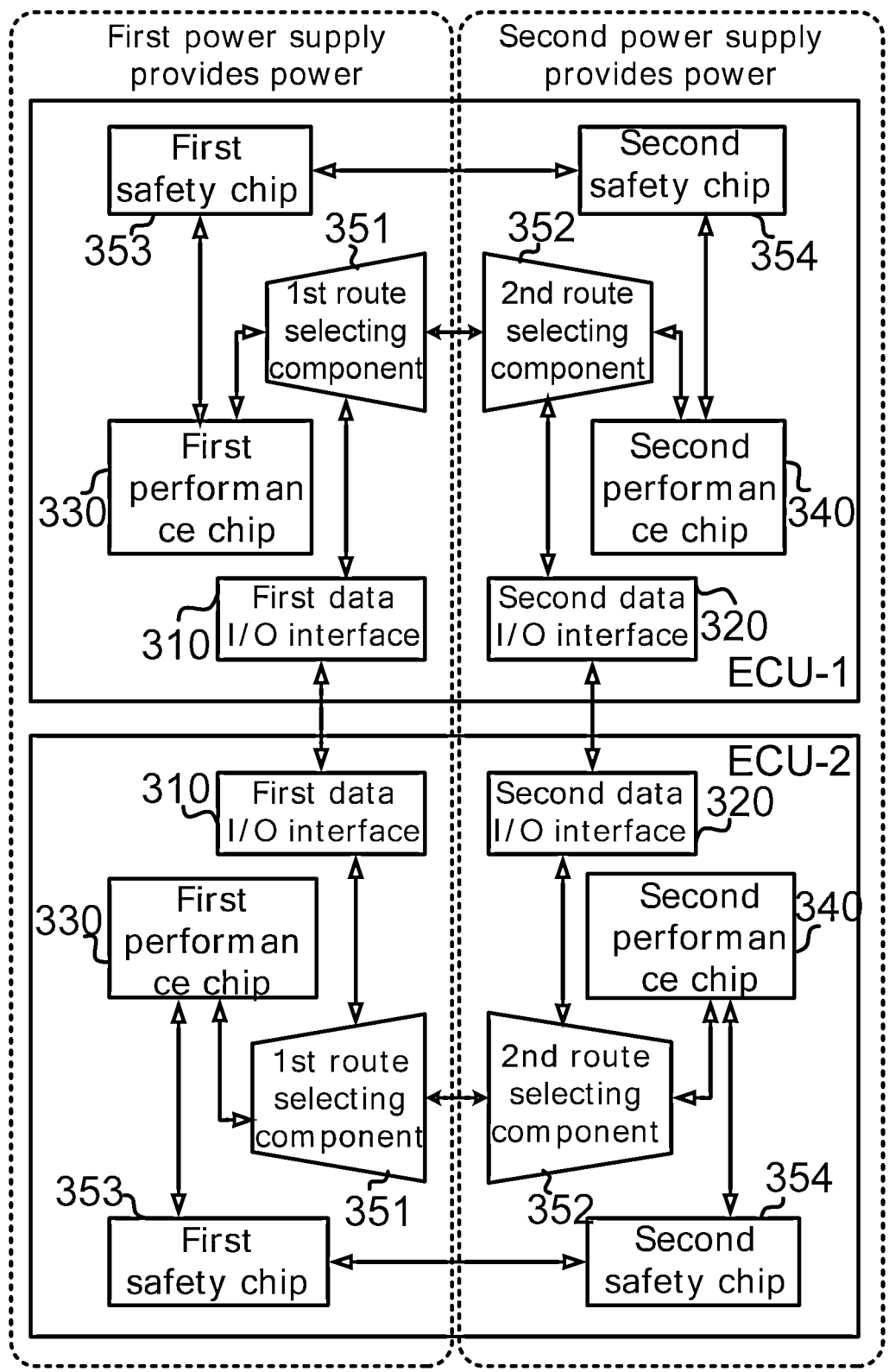
FIG. 6 is a schematic diagram of a control system powered by two power supplies according to some exemplary embodiments of this disclosure, in which the two dotted line boxes indicate the two power supplier, i.e., a first power supplier and a second power supplier.

In some exemplary embodiments, the control system may further include a first power supply and a second power supply. The first power supply and the second power supply are two mutually independent power supply systems, which do not affect each other. Both the first power supply and the second power supply are configured to provide electric energy for the ECUs in the control system. FIG. 6 shows a schematic diagram of a control system powered by two power supplies according to some exemplary embodiments of the present disclosure. Taking the control system including two ECUs as an example for illustration, the control system may include a first power supply and a second power supply, in addition to ECU-1 and ECU-2 (the first power supply and the second power supply are not shown in FIG. 6). The first data I/O interface 310, the first performance chip 330, the first route selecting component 351, and the first safety chip 353 of each ECU in the control system are all connected to the first power supply. That is to say, the first power supply is configured to supply power to the first data I/O interface 310, the first performance chip 330, the first route selecting component 351, and the first safety chip 353 of each ECU in the control system. The second data I/O interface 320, the second performance chip 340, the second route selecting component 352, and the second security chip 354 of each ECU in the control system are all connected to the second power supply. That is to say, the second power supply is configured to supply power to the second data I/O interface 320, the second performance chip 340, the second route selecting component 352, and the second safety chip 354 of each ECU in the control system.

In the control system shown in FIG. 6, for each ECU, since some components on the ECU are powered by the first power supply, and other components are powered by the second power supply, when the first power supply fails, on the ECU, the components connected to the first power supply do not function properly, while the components connected to the second power supply are not affected. Similarly, when the second power supply fails, on the ECU, the components connected to the second power supply do not function properly, while the components connected to the first power supply are not affected. It can be seen that the control system may improve the reliability of a single ECU by using two independent power supplies to supply power to different components of the ECU.

In the control system shown in FIG. 6, for the entire control system, when the first power supply and the second power supply are working normally, the control system can form a ring data path as shown in FIG. 5A. For the data transfer process based on the ring data path, reference may be made to the relevant description above, and details are not repeated herein. When one of the power supplies fails, it may only cause some route sections in the ring data path to fail, but does not cause the entire ring data path to be paralyzed. For example, referring to FIG. 6, assuming that the second power supply fails, the components connected to the second power supply (that is, the second data I/O interface 320, the second performance chip 340, the second route selecting component 352 and the second safety chip 354 of ECU-1, as well as the second data I/O interface 320, the second performance chip 340, the second route selecting component 352 and the second safety chip 354 of ECU-2) stop working. While the components connected to the first power supply (that is, the first data I/O interface 310, the first performance chip 330, the first route selecting component 351 and the first safety chip 353 of ECU-1, as well as the first data I/O interface 310, the first performance chip 330, the first route selecting component 351 and the first safety chip 353 of ECU-2) may still work properly. In this case, the ring data path may degenerate into a linear data path, that is, between the first safety chip 353 of ECU-1, the first performance chip 330 of ECU-1, the first performance chip 330 of ECU-2, and the first safety chip 353 of ECU-2, a linear data path for bidirectional transmission is formed. For example, the data transfer mode from ECU-1 to ECU-2 may be as follows: in ECU-1, the data may be transferred from the first safety chip 353 to the first performance chip 330, and then to the first data I/O interface 310 through the first route selecting component 351. The data is then transferred to the first data I/O interface 310 of ECU-2 through the first data I/O interface 310 of ECU-1. In ECU-2, the data may be transferred to the first performance chip 353 through the first routing component 351, and then transferred to the first safety chip 353. In another example, the data transfer mode from ECU-2 to ECU-1 may be as follows: in ECU-2, the data may be transferred from the first safety chip 353 to the first performance chip 330, and then to the first data I/O interface 310 through the first route selecting component 351.

The data is then transferred to the first data I/O interface 310 of ECU-1 through the first data I/O interface 310 of ECU-2. In ECU-1, the data is transferred to the first performance chip 353 through the first route selecting component 351, and then transferred to the first safety chip 353. Thus, in the case where the control system uses two independent power supplies to supply power to various components, if one of the power supplies fails, it may only affect a part of the data transfer path of the control system, but does not cause all the data transfer paths to fail. Therefore, the reliability of the entire control system may be improved.

In some exemplary embodiments, based on the data path formed in the single ECU shown in FIG. 4, when the control system 200 includes M ECUs, where M is an integer greater than 1, the M ECUs may be connected in a preset topology. In some exemplary embodiments, the preset topology may be a star (Y) connection. In such a connection manner, the control system 200 may further include a switch circuit 400. The first data I/O interface 310 and the second data I/O interface 320 of each of the M ECUs may be connected to the switch circuit 400, such that the M ECUs may form a star connection. For example, the switch circuit 400 may include a plurality of interfaces, and different interfaces may have preset connection relationships. By connecting the first data I/O interface and the second data I/O interface of each ECU with different interfaces in the switch circuit 400, a data path may be formed between different ECUs. In other words, the switch circuit 400 may connect performance chips in different ECUs.

Figure 7A:
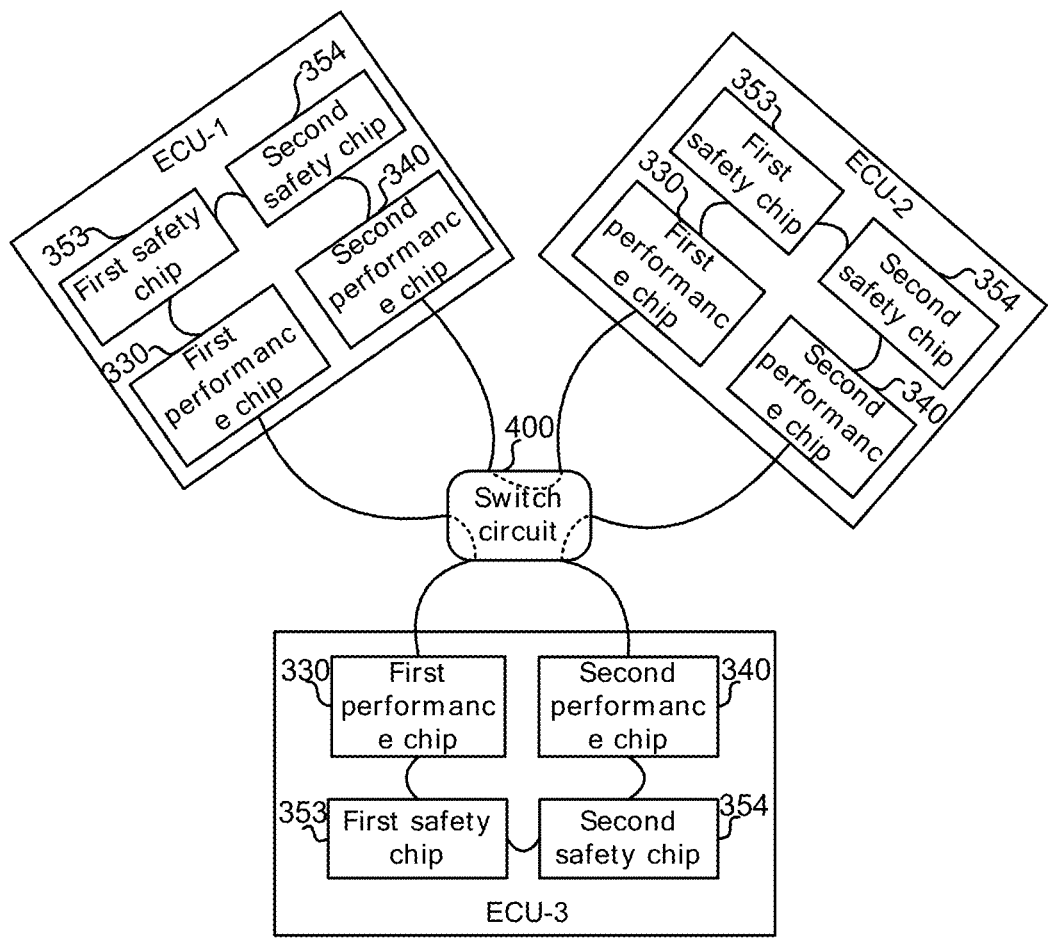
FIG. 7A is a schematic diagram of a star connection (Y connection) formed by a plurality of ECUs according to some exemplary embodiments of this disclosure.

As an example, FIG. 7A is a schematic diagram of a star connection formed by a plurality of ECUs according to some exemplary embodiments of this disclosure. As shown in FIG. 7A, the control system 200 includes three ECUs 300 and a switch circuit 400, where the three ECUs 300 are ECU-1, ECU-2, and ECU-3, respectively. The first data I/O interface of ECU-1, the second data I/O interface of ECU-1, the first data I/O interface of ECU-2, the second data I/O interface of ECU-2, the first data I/O interface of ECU-3, and the second data I/O interface of ECU-3 may be connected to the switch circuit 400. In this way, the three ECUs may form a star connection with the switch circuit 400 as a center thereof. The connection relationships of the interfaces in the switch circuit 400 may be set according to control requirements of the executive component, to form a specific data path between the three ECUs, thereby meeting the control requirements of the executive component. For example, assuming that the connection relationships of the interfaces in the switch circuit 400 are shown by the dashed lines in FIG. 7A, a ring data path may be formed between the three ECUs based on the switch circuit 400. It should be noted that, data paths in linear forms or other forms may also be formed between the plurality of ECUs based on the switch circuit 400. The ring data path is merely an example, which is not limited in the present disclosure.

Figure 7B:
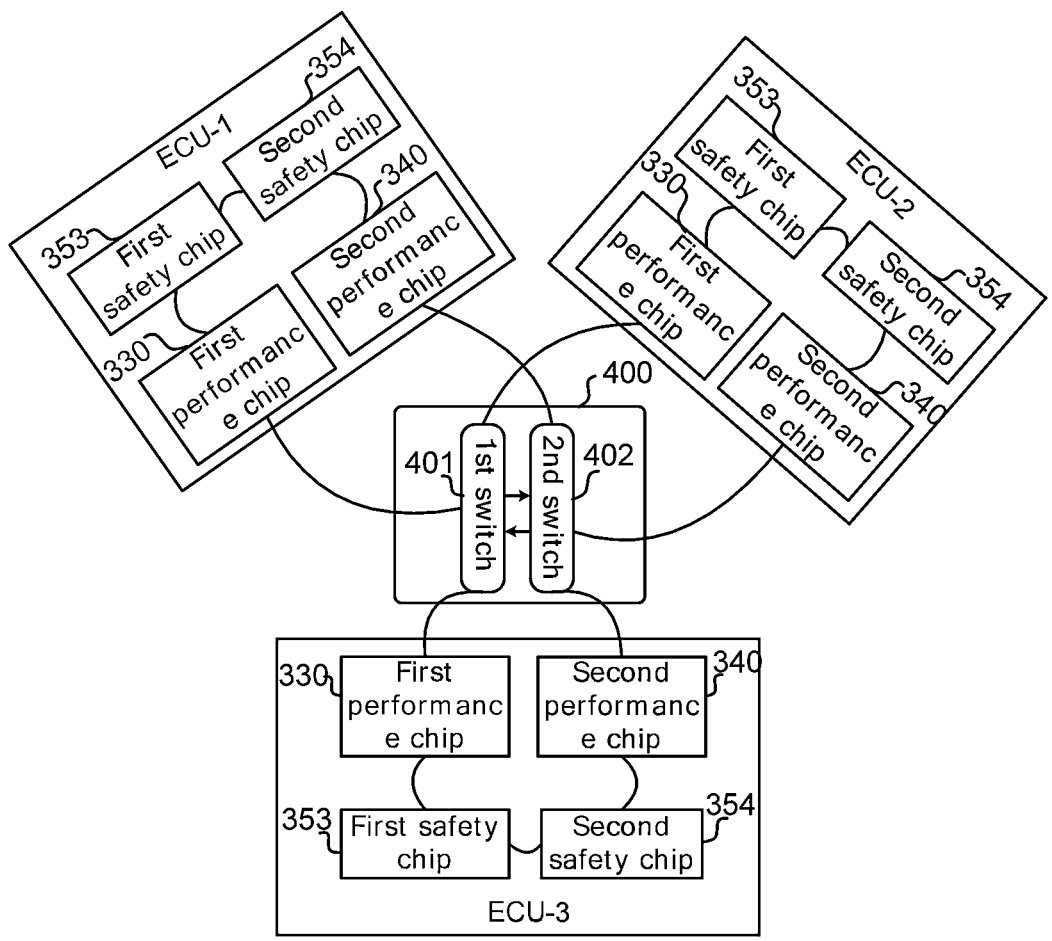
FIG. 7B is a schematic diagram of a star connection (Y connection) formed by a plurality of ECUs according to some exemplary embodiments of this disclosure.

FIG. 7B shows another schematic diagram of forming a star connection among multiple ECUs according to some exemplary embodiments of the present disclosure. The difference between FIG. 7B and FIG. 7A is that the switch circuit 400 may include a first switch 401 and a second switch 402. The first switch 401 and the second switch 402 are connected in communication, and data can be exchanged between them. The first switch 401 is respectively connected to the first data I/O interface of each ECU in the control system. The second switch 402 is respectively connected in communication with the second data I/O interface of each ECU in the control system. In this way, chips of different ECUs in the control system may realize interconnection and intercommunication through the first switch 401 and the second switch 402.

It should be understood that, in the control system shown in FIG. 7B, data exchange between chips of different ECUs may be performed through the first switch 401; data exchange may also be performed through the second switch 402; or data exchange may be performed the first switch 401 and the second switch 402 at the same time. For example, data may be transferred from the first safety chip 353 and the first performance chip 330 of ECU-1 to the first performance chip 330 and the first safety chip 353 of ECU-3 through the first switch 401. In another example, data may be transferred from the second safety chip 354 and the second performance chip 340 of ECU-3 to the second performance chip 340 and the second safety chip 354 of ECU-1 through the second switch 402. In another example, data may be transferred from the first safety chip 353 and the first performance chip 330 of ECU-1 to the second performance chip 340 and the second safety chip 354 of ECU-2 through the first switch 401 and the second switch 402. In yet another example, data may be transferred from the first safety chip 353 and the first performance chip 330 of ECU-2 to the second performance chip 340 and the second safety chip 354 of ECU-3 through the first switch 401 and the second switch 402. In some Exemplary embodiments, chips of different ECUs may also form a ring data path through the first switch 401 and the second switch 402. For example, the ring data path formed between ECU-1 and ECU-3 may pass through the following parts in sequence: the first safety chip 353 of ECU-1, the first performance chip 330 of ECU-1, the first switch 401, the first performance chip 330 of ECU-3, the first safety chip 353 of ECU-3, the second safety chip 354 of ECU-3, the second performance chip 340 of ECU-3, the second switch 402, the second performance chip 340 of ECU-1, and the second safety chip 353 of ECU-1. It can be seen that the control system may form multiple data paths in different forms between multiple ECUs by using the first switch circuit 401 and the second switch circuit 402. This makes the data transfer mode in the control system more flexible, so as to meet the respective control requirements in different application scenarios.

In the control system shown in FIG. 7B, when one of the first switch 401 and the second switch 402 fails, the chips of each ECU may exchange data through the other switch. For example, assuming that the first switch 401 fails, the chips of ECU-1 and ECU-3 may transfer data through the second switch 402. For example, assuming that the first performance chip 330 of ECU-1 needs to transfer data to the first performance chip 330 of ECU-3, the data may be transferred sequentially through to the following data path: the data is transferred in ECU-1 through the first performance chip 330, the first safety chip 353, the second safety chip 354, and the second performance chip 340, and then transferred to ECU-3 through the second switch 402, then the data passes through the second performance chip 340, the second safety chip 354 and the first safety chip 353 sequentially in the ECU-3, and finally reaches the first performance chip 330. It can be seen that the control system may achieve redundant backup of data exchange functions by providing the first switch 401 and the second switch 402. In the case of a failure of one of the switches, different ECUs in the control system may exchange data through another switch, so that the overall operation of the control system may not be affected, and the reliability of the control system may be improved.

It should be noted that, FIGS. 7A and 7B shows an example of a star connection formed by three ECUs 300 provided by the present disclosure. In some exemplary embodiments, the ECU 300 provided by the present disclosure may form a star connection with other types of ECUs through the switch circuit 400, and such a case is not illustrated herein.

In the control system shown in FIG. 7A to FIG. 7B, by connecting the data I/O interfaces of different ECUs through the switch circuit, the number of ECUs in the control system may be increased conveniently, in order to extend the computational capacity of the control system.

In some exemplary embodiments, the communication between components in the ECU 300 may be a unified bus connection. Taking the ECU 300 shown in FIG. 2 as an example, the communication between the first performance chip 330 and the first safety chip 353, the communication between the second performance chip 340 and the second safety chip 354, the communication between the first safety chip 353 and the second safety chip 354, the communication between the first performance chip 330 and the first route selecting component 351, the communication between second performance chip 340 and the second route selecting component 352, the communication between the first route selecting component 351 and the second route selecting component 352, the communication between the first route selecting component 351 and the first data I/O interface 310, the communication between the second route selecting component 352 and the second data I/O interface 320 may be all unified bus connections. In this way, the internal of the ECU 300 may have high performance in terms of bandwidth, delay, and jitter.

In some exemplary embodiments, the communication between components in each ECU 300 may be based on a first communication protocol. For example, the first communication protocol may be a Peripheral Component Interconnect Express (PCIe) protocol, or a modified PCIe protocol, where the modified PCIe protocol may be a standard PCIe protocol with changes/modifications at one, some, or more levels of the PCIe layered architecture. In other examples, the first communication protocol may be other protocols, such as a Cache Coherent Interconnect for Accelerators protocol, an NVLink protocol, or the like.

In some exemplary embodiments, communication between data I/O interfaces of different ECUs may be a unified bus connection. For example, in the example shown in FIG. 5A, the communication between the first data I/O interface 310 of ECU-1 and the second data I/O interface 320 of ECU-2, and the communication between the second data I/O interface 320 of ECU-1 and the first data I/O interface 310 of ECU-2 may be both unified bus connections. In another example, as shown in FIG. 5B, the communication between the first data I/O interface 310 of ECU-1 and the second data I/O interface 320 of ECU-2, the communication between the first data I/O interface 310 of ECU-2 and the second data I/O interface 320 of ECU-3, the communication between the first data I/O interface 310 of ECU-3 and the second data I/O interface 320 of ECU-4, and the communication between the first data I/O interface 310 of ECU-4 and the second data I/O interface 320 of ECU-1 may be all unified bus connections. In another example, as shown in FIG. 7A, the communication between the first data I/O interface 310 of ECU-1 and the switch circuit 400, the communication between the second data I/O interface 320 of ECU-1 and the switch circuit 400, the communication between the first data I/O interface 310 of ECU-2 and the switch circuit 400, the communication between the second data I/O interface 320 of ECU-2 and the switch circuit 400, the communication between the first data I/O interface 310 of ECU-3 and the switch circuit 400, and the communication between the second data I/O interface 320 of ECU-3 and the switch circuit 400 may be all unified bus connections. In this way, connections between different ECUs may have high performance in terms of bandwidth, delay, and jitter.

In some exemplary embodiments, the communication between data I/O interfaces of different ECUs may be based on a second communication protocol. The second communication protocol may be the same as the first communication protocol. For example, the first communication protocol and the second communication protocol may be both PCIe protocols, or the first communication protocol and the second communication protocol may be both other protocols. As the second communication protocol is the same as the first communication protocol, the communication manner between different ECUs may be the same as the internal communication manner of each ECU, thereby implementing seamless extension between different ECUs. In addition, as the communication manners inside the ECU and between ECUs are the same, the importance of the software driver and middleware code may be further enhanced.

FIG. 2 to FIG. 7B show various examples in which the route selector 350 may include two safety chips. In some exemplary embodiments, the route selector 350 may alternatively include one safety chip. For differentiation, the safety chip in the route selector 350 may be referred to as a third safety chip. The third safety chip may be in communication with the first route selecting component 351 and the second route selecting component 352 separately. In the first mode, the third safety chip may control states of the first route selecting component 351 and the second route selecting component 352, so as to enable the communication between the first performance chip 330 and the second performance chip 340. In this way, the third safety chip, the first performance chip 330, and the second performance chip 340 may form a ring data path. In the second mode, the third safety chip may control the state of the first route selecting component 351 to enable the communication between the first performance chip 330 and the first data I/O interface 310, and may control the state of the second route selecting component 352 to enable the communication between the second performance chip 340 and the second data I/O interface 320. In this way, the first data I/O interface 310, the first performance chip 330, the third safety chip, the second performance chip 340, and the second data I/O interface 320 may form a data path. It should be understood that, the data path formed in this case and the extension manner of the plurality of ECUs are similar to those shown in FIG. 3 to FIG. 7B, and details will not be described herein again.

Further referring to FIG. 2, in some exemplary embodiments, each ECU 300 may further include a printed circuit board (PCB) 360. The first data I/O interface 310 and the second data I/O interface 320 may be disposed on the PCB 360. The PCB may be further provided with two performance chip interfaces (not shown in FIG. 2); the first performance chip 330 and the second performance chip 340 may be disposed on the two performance chip interfaces, respectively. In some exemplary embodiments, the PCB may be further provided with at least one safety chip interface (not shown in FIG. 2); the safety chip in the route selector 350 may also be disposed on the safety chip interface. For example, the PCB may be provided with two safety chip interfaces; the first safety chip 353 and the second safety chip 354 may be disposed on the two safety chip interfaces, respectively. In some exemplary embodiments, the first route selecting component 351 and the second route selecting component 352 may also be disposed on the PCB. In some exemplary embodiments, buses between components in the ECU 300 may also be disposed on the PCB.

Figure 8:
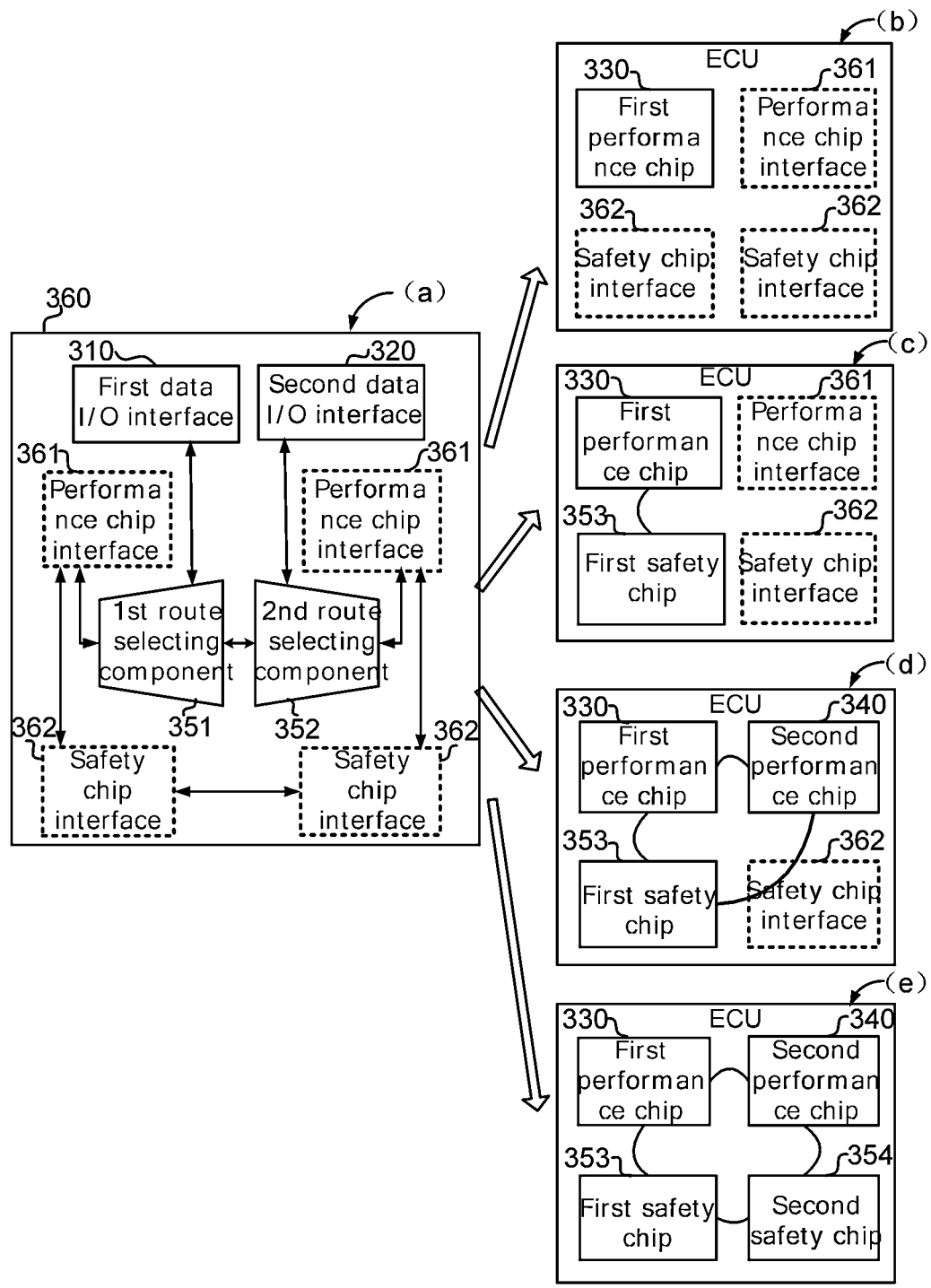
FIG. 8 is a schematic diagram of a PCB and different control systems generated based on the PCB according to some exemplary embodiments of this disclosure.

In this way, with the PCB, different control systems may be built flexibly by disposing different numbers of performance chips and/or safety chips on the chip interfaces of the PCB. The following provides illustration with reference to FIG. 8. FIG. 8 is a schematic diagram of a PCB and different control systems generated based on the PCB according to some exemplary embodiments of this disclosure. (a) in FIG. 8 shows a schematic diagram of a PCB without any chip. As shown in (a) in FIG. 8, the PCB 360 is provided with two performance chip interfaces 361 and two safety chip interfaces 362. (b), (c), (d), and (e) in FIG. 8 show schematic diagrams of single-ECU control systems obtained by disposing different numbers of chips on the PCB shown in (a). It should be noted that, (b), (c), (d), and (e) in FIG. 8 only show performance chips and safety chips, and other components (such as data I/O interfaces and route selecting components) are not shown.

In some exemplary embodiments, it is assumed that control requirements of an executive component are relatively simple, thus control data corresponding to the executive component may be obtained by using only one performance chip, and the control data does not need to be verified by the safety chip. In such a case, the first performance chip 330 may be disposed on one of the performance chip interfaces 361 of the PCB to obtain a control system corresponding to the executive component. For example, the control system is as shown in (b) of FIG. 8.

In some exemplary embodiments, it is assumed that control requirements of an executive component are relatively simple, thus control data corresponding to the executive component may be obtained by using only one performance chip, but the control data needs to be verified by the safety chip. In such a case, the first performance chip 330 may be disposed on one of the performance chip interfaces 361 of the PCB, and the first safety chip 353 may be disposed on one of the safety chip interfaces 362, so as to obtain a control system corresponding to the executive component. For example, the control system is as shown in (c) of FIG. 8.

In some exemplary embodiments, it is assumed that control requirements of an executive component are relatively complex, two performance chips may be needed to obtain control data corresponding to the executive component, and the control data needs to be verified by the safety chip. In such a case, the first performance chip 330 and the second performance chip 340 may be disposed on the two performance chip interfaces 361 of the PCB, respectively, and the first safety chip 353 may be disposed on one of the safety chip interfaces 362, so as to obtain a control system corresponding to the executive component. For example, the control system is as shown in (d) of FIG. 8. In some exemplary embodiments, the first safety chip 353 and the second safety chip 354 may alternatively be disposed on the two safety chip interfaces 362, respectively, so as to obtain a control system corresponding to the executive component. For example, the control system is as shown in (e) of FIG. 8.

It should be understood that, (b) to (e) in FIG. 8 show control systems including a single ECU. In some exemplary embodiments, it is assumed that control requirements of an executive component are more complex, and three or more performance chips may be needed to obtain control data corresponding to the executive component. In such a case, a plurality of ECUs as shown in (c) or (d) of FIG. 8 may be combined to obtain a control system corresponding to the executive component. It may be understood that, a specific combination manner of the plurality of ECUs is not limited herein. In addition, the obtained control system is similar to that shown in FIG. 5A, FIG. 5B, FIG. 7A, or FIG. 7B. Details will not be described herein again.

As can be seen in FIG. 8, based on the same PCB hardware foundation, various control systems with different computational capacities may be obtained through flexible extension. Specifically, based on the above PCB hardware foundation, the control systems in four forms as shown in (b), (c), (d), and (e) of FIG. 8 may be obtained by adjusting the number of chips inside the PCB. Further, by adjusting the number of PCBs, the control system as shown in FIG. 5A, FIG. 5B, FIG. 7A, or FIG. 7B may be obtained. As can be seen, the control system provided by the present disclosure may have high intra-ECU scalability and inter-ECU scalability. In addition, as various control systems are all implemented based on the same PCB hardware foundation, the PCBs may have high reusability for mass production, and the development costs may be reduced.

In some exemplary embodiments, the first performance chip 330, the second performance chip 340, the first safety chip 353, and the second safety chip 354 in the ECU 300 may each be a System on Chip (SoC). The structure of the SoC will be described below with reference to FIG. 9.

Figure 9:
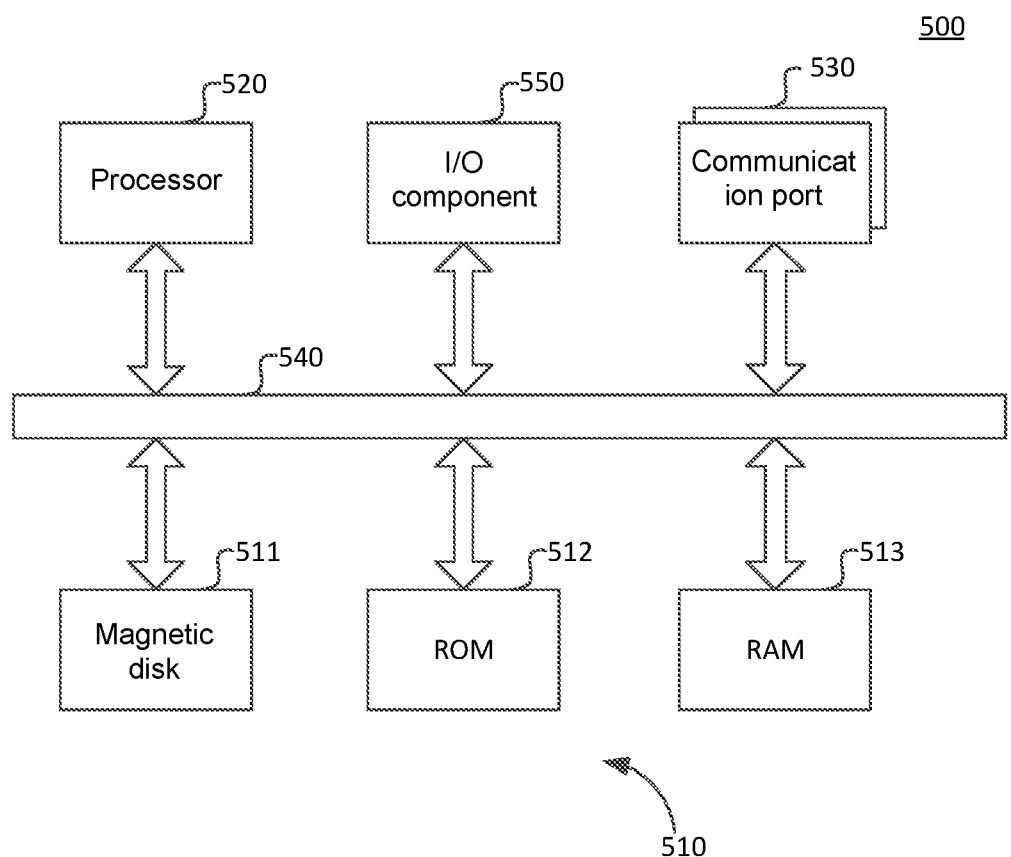
FIG. 9 is a schematic structural diagram of a System on Chip (SoC) according to some exemplary embodiments of this disclosure.

FIG. 9 is a schematic structural diagram of a SoC according to some exemplary embodiments of this disclosure. The SoC may be used as the first performance chip 330, the second performance chip 340, the first safety chip 353, or the second safety chip 354. As shown in FIG. 9, the SoC 500 may include at least one storage medium 510 and at least one processor 520. In some exemplary embodiments, the SoC 500 may further include a communication port 530 and an internal communication bus 540. In addition, the SoC 500 may further include an I/O component 550.

The internal communication bus 540 may be connected to different system components, including the storage medium 510, the processor 520, the I/O component 550, and the communication port 530.

The I/O component 550 may support input/output between the SoC 500 and other chips.

The communication port 530 may be used for data communication between the SoC 500 and the external. The communication port 530 may be a wired communication port or a wireless communication port.

The storage medium 510 may include a data storage apparatus. The data storage apparatus may be a non-transitory storage medium or a transitory storage medium. For example, the data storage apparatus may include one or more of a magnetic disk 511, a read-only memory (ROM) 512, or a random access memory (RAM) 513. The storage medium 510 may further include at least one instruction set stored in the data storage apparatus. The instruction set may be computer program code, and the computer program code may include programs, routines, objects, components, data structures, procedures, modules, and the like for generating control data, or the computer program code includes programs, routines, objects, components, data structures, procedures, modules, and the like for verifying the control data.

The at least one processor 520 may be in communication with the at least one storage medium 510 and the communication port 530 through the internal communication bus 540. The at least one processor 520 may be configured to execute the at least one instruction set. When the SoC 500 operates, the at least one processor 520 reads the at least one instruction set, and executes, according to the instruction of the at least one instruction set, a method for generating control data or a method for verifying control data. The processor 520 may be in the form of one or more processors. In some exemplary embodiments, the processor 520 may include one or more hardware processors, such as a microcontroller, a microprocessor, a reduced instruction set computer (RISC), an application specific integrated circuit (ASIC), an application specific instruction set processor (ASIP), a central processing unit (CPU), a general purpose graphics processing unit (GPGPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, or any combination thereof. For illustration, only one processor 520 is described in the SoC 500 in the disclosure. However, it should be noted that, the SoC 500 in the disclosure may include more processors. Therefore, the method/step for generating control data or verifying the control data disclosed in this disclosure may be executed by one processor as described in the disclosure, or may be jointly executed by a plurality of processors.

The foregoing describes some specific exemplary embodiments of the present disclosure. Other embodiments also fall within the scope of the appended claims. In some cases, the actions or steps described in the claims may be performed in sequences different from those in the exemplary embodiments, and may still achieve expected results. In addition, the processes depicted in the accompanying drawings do not necessarily require the specific orders or sequences as shown in order to achieve the expected results. In some implementations, multitasking and parallel processing may also be possible or may be advantageous.

In summary, after reading this detailed disclosure, those skilled in the art may understand that the foregoing detailed disclosure may be presented by way of example only, and may not be limited. Although there may be no explicit description, those skilled in the art may understand that this disclosure intends to cover various reasonable changes, improvements and modifications of the exemplary embodiments. These changes, improvements and modifications are intended to be included in this disclosure and are within the spirit and scope of this disclosure.

In addition, some specific terms in this disclosure have been used to describe the embodiments of this disclosure. For example, "one embodiment", "an embodiment" and/or "some exemplary embodiments" mean that a specific feature, structure, or characteristic described in combination with the embodiment may be included in at least one embodiment of this disclosure. Therefore, it can be emphasized and should be understood that two or more references to "an embodiment" or "one embodiment" or "an alternative embodiment" in various parts of this disclosure do not necessarily all refer to the same embodiment. In addition, specific feature, structure, or characteristic may be appropriately combined in one or more embodiments of this disclosure.

It should be understood that in the foregoing description of the exemplary embodiments of this disclosure, to help understand a feature and for the purpose of simplifying this disclosure, this disclosure sometimes combines various features in a single embodiment, a drawing, or description thereof. However, this does not mean that the combination of these features is necessary. It is possible for those skilled in the art to extract some of the devices as a single embodiment when reading this disclosure. In other words, the embodiments in this disclosure may also be understood as an integration of multiple sub-embodiments. The content of each sub-embodiment may also be valid when it gas fewer features than a previously disclosed single embodiment.

Each patent, patent application, patent application publication and other materials cited herein, such as articles, books, disclosures, publications, documents, articles and the like, may be incorporated herein by reference. The entire content used for all purposes, except for any related litigation document history, any identical litigation document that may be inconsistent or conflicting with this document, or any identical litigation document that may have restrictive influence on the broadest scope of the claims' history, are associated with this document now or in the future. For example, if the description, definition, and/or use of terms in any associated materials contained herein is inconsistent with or in conflict with that in this document, the terms in this document shall prevail.

Finally, it should be understood that the exemplary embodiments of the present disclosure disclosed herein are for describing the principle of the embodiment of this disclosure. Other modified embodiments are also within the scope of this disclosure. Therefore, the embodiments disclosed in this disclosure are merely examples rather than limitations. Those skilled in the art may adopt alternative configurations according to the exemplary embodiments of this disclosure to implement the application in this disclosure. Therefore, the embodiments of this disclosure are not limited to those explicitly described in the present disclosure.

What is claimed is:

1. A control system, comprising
at least one electronic control unit (ECU), wherein
the at least one ECU each includes:
 a first data input/output (I/O) interface and a second data I/O interface,
 a first performance chip and a second performance chip, and
 a route selector in communication with the first data I/O interface, the second data I/O interface, the first performance chip, and the second performance chip, wherein
 the route selector includes a first mode and a second mode,
 in the first mode, the route selector enables data communication between the first performance chip and the second performance chip, and
 in the second mode, the route selector enables data communication between the first performance chip and the first data I/O interface, and further enables data communication between the second performance chip and the second data I/O interface.

2. The control system according to claim 1, wherein the route selector includes:
 a first route selecting component, in communication with the first performance chip and the first data I/O interface;
 a second route selecting component, in communication with the second performance chip, the second data I/O interface, and the first route selecting component; and
 at least one safety chip, in communication with the first route selecting component and the second route selecting component, wherein the at least one safety chip is configured to:
  in the first mode, control the first route selecting component and the second route selecting component to enable the data communication between the first performance chip and the second performance chip, and
  in the second mode, control the first route selecting component to enable the data communication between the first performance chip and the first data I/O interface, and control the second route selecting component to enable the data communication between the second performance chip and the second data I/O interface.

3. The control system according to claim 2, wherein the at least one safety chip includes:
 a first safety chip, in communication with the first performance chip and the first route selecting component; and
 a second safety chip, in communication with the second performance chip and the second route selecting component.

4. The control system according to claim 3, further comprising:
 a first power supply, configured to provide power for the first data I/O interface, the first performance chip, the first route selecting component, and the first safety chip of each of the at least one ECU; and
 a second power supply, configured to provide power for the second data I/O interface, the second performance chip, the second route selecting component, and the second safety chip of each of the at least one ECU.

5. The control system according to claim 2, wherein
the first performance chip generates first control data during operation, and the second performance chip generates second control data during operation; and
the at least one safety chip is in communication with the first performance chip and the second performance chip to verify at least one of the first control data or the second control data.

6. The control system according to claim 1, wherein the at least one ECU each further includes:
 a printed circuit board (PCB) including two performance chip interfaces, wherein
 the first data I/O interface and the second data I/O interface are disposed on the PCB, and
 the first performance chip and the second performance chip are disposed on the two performance chip interfaces, respectively.

7. The control system according to claim 1, wherein communications in each ECU is through a unified bus connection.

8. The control system according to claim 7, wherein the communications in each ECU is based on a Peripheral Component Interconnect Express (PCIe) protocol.

9. The control system according to claim 1, wherein
the at least one ECU includes M ECUs connected in a preset topology, M is an integer greater than 1; and
the first data I/O interface of each of the M ECUs is in communication with the first data I/O interface or the second data I/O interface of a neighboring ECU in the preset topology to form a ring connection.

10. The control system according to claim 9, wherein
communications between components in each ECU are based on a first communication protocol;
communications between data I/O interfaces of different ECUs are based on a second communication protocol; and
the first communication protocol is the same as the second communication protocol.

11. The control system according to claim 1, further comprising a switch circuit, wherein
the at least one ECU includes M ECUs, M is an integer greater than 1, and
the switch circuit is in communication with the first data I/O interface and the second data I/O interface of each of the M ECUs to form a star connection.

12. The control system according to claim 11, wherein the switch circuit includes:
 a first switch, respectively in communication with the first data I/O interface of each of the M ECUs; and
 a second switch, in communication with the first switch, and respectively in communication with the second data I/O interface of each of the M ECUs.

13. A vehicle, comprising:
an executive component; and
a control system configured to send control data to the executive component, including at least one electronic control unit (ECU), wherein
the at least one ECU each includes:
 a first data input/output (I/O) interface and a second data I/O interface;
 a first performance chip and a second performance chip; and a route selector in communication with the first data I/O interface, the second data I/O interface, the first performance chip, and the second performance chip, wherein the route selector includes a first mode and a second mode, in the first mode, the route selector enables a data communication between the first performance chip and the second performance chip, and in the second mode, the route selector enables a data communication between the first performance chip and the first data I/O interface, and further enables a data communication between the second performance chip and the second data I/O interface.

14. The vehicle according to claim 13, wherein the route selector includes:

a first route selecting component, in communication with the first performance chip and the first data I/O interface;

a second route selecting component, in communication with the second performance chip, the second data I/O interface, and the first route selecting component; and at least one safety chip, in communication with the first route selecting component and the second route selecting component, wherein the at least one safety chip is configured to:

in the first mode, control the first route selecting component and the second route selecting component to enable the data communication between the first performance chip and the second performance chip, and in the second mode, control the first route selecting component to enable the data communication between the first performance chip and the first data I/O interface, and control the second route selecting component to enable a communication between the second performance chip and the second data I/O interface.

15. The vehicle according to claim 14, wherein the at least one safety chip includes:

a first safety chip, in communication with the first performance chip and the first route selecting component; and a second safety chip, in communication with the second performance chip and the second route selecting component, wherein the control system further includes:

a first power supply, configured to provide power for the first data I/O interface, the first performance chip, the first route selecting component, and the first safety chip of each of the at least one ECU; and a second power supply, configured to provide power for the second data I/O interface, the second performance chip, the second route selecting component, and the second safety chip of each of the at least one ECU.

16. The vehicle according to claim 14, wherein the first performance chip generates first control data during operation, and the second performance chip generates second control data during operation; and the at least one safety chip is in communication with the first performance chip and the second performance chip to verify at least one of the first control data or the second control data.

17. The vehicle according to claim 13, wherein the at least one ECU each further includes:

a printed circuit board (PCB) including two performance chip interfaces, wherein the first data I/O interface and the second data I/O interface are disposed on the PCB, and the first performance chip and the second performance chip are disposed on the two performance chip interfaces respectively;

communications in each ECU is through a unified bus connection and based on a Peripheral Component Interconnect Express (PCIe) protocol;

the at least one ECU includes M ECUs connected in a preset topology, M is an integer greater than 1; and the first data I/O interface of each of the M ECUs is in communication with the first data I/O interface or the second data I/O interface of a neighboring ECU in the preset topology to form a ring connection.

18. The vehicle according to claim 17, wherein communication connection between components in each ECU is based on a first communication protocol;

communication connection between data I/O interfaces of different ECUs is based on a second communication protocol; and the first communication protocol is the same as the second communication protocol.

19. The vehicle according to claim 13, further comprising a switch circuit, wherein the at least one ECU includes M ECUs, M is an integer greater than 1, and the switch circuit is in communication with the first data I/O interface and the second data I/O interface of each of the M ECUs to form a star connection.

20. The vehicle according to claim 19, wherein the switch circuit includes:

a first switch, respectively in communication with the first data I/O interface of each of the M ECUs; and a second switch, in communication with the first switch, and respectively in communication with the second data I/O interface of each of the M ECUs.

* * * * *